United States Patent [19]

Rossi et al.

[11] Patent Number: 4,730,032

[45] Date of Patent: Mar. 8, 1988

[54] PHENYLACETYLENE-SUBSTITUTED SCHIFF'S BASE MONOMERS AND ELECTROCONDUCTIVE POLYMERS

[75] Inventors: Robert D. Rossi, Levittown, Pa.; Steven P. Fenelli, Hillsborough, N.J.

[73] Assignee: National Starch and Chemical Corporation, Bridgewater, N.J.

[21] Appl. No.: 19,467

[22] Filed: Feb. 26, 1987

[51] Int. Cl.[4] .............................................. C08F 38/00
[52] U.S. Cl. ..................................... 526/285; 564/248; 564/272; 564/274; 526/248
[58] Field of Search .................. 564/248, 272, 274; 526/285

[56] References Cited

U.S. PATENT DOCUMENTS

| | | | |
|---|---|---|---|
| 4,178,430 | 12/1979 | Bilow | 528/245 |
| 4,283,557 | 8/1981 | Walton | 564/272 |
| 4,336,362 | 6/1982 | Walton | 526/248 |

OTHER PUBLICATIONS

Voznesenskaya, N. et al., "Synthesis and Properties of Oligomers with Acetylene End Groups" CA 102:149894b (1985).

*Primary Examiner*—Paul R. Michl
*Attorney, Agent, or Firm*—Edwin M. Szala; Ellen T. Dec

[57] ABSTRACT

Novel mono- or difunctional phenylacetylene-substituted Schiff's base monomers useful in the preparation of electrically conducting polymers is disclosed. On heating, these monomers melt to a viscous liquid state, and on continued heating above about 300° C. polymerize to form an electrically insulating thermoset polymer. On further post-cure heat treatment, the polymer becomes electroconductive showing a bulk conductivity of at least $10^{-2}$ S/cm.

18 Claims, No Drawings

PHENYLACETYLENE-SUBSTITUTED SCHIFF'S BASE MONOMERS AND ELECTROCONDUCTIVE POLYMERS

BACKGROUND OF THE INVENTION

This invention relates to electrically conducting polymers, and is particularly directed to such polymers obtained from mono- or difunctional phenylacetylene-substitued Schiff's base monomers.

For many years synthetic organic polymers have attracted attention in a variety of electrical and electronic applications because of their outstanding insulator properties. However, since the discovery of the conducting properties of polyacetylene in the mid-seventies, replacement of metallic conductors with conductive polymers has been an important goal in chemically oriented research. During the past decade research efforts have intensified in obtaining improved, electroconductive, themosetting polymers useful, for example, in applications such as low-cost photovoltaic cells, moldable electrodes for use in light-weight batteries, composites, electromagnetic shielding devices, and the like.

The term "conductive polymer" is typicaly used to describe three distinct categories of polymeric materials. In the first category there are metal or graphite-filled polymers where conductivity is due solely to the filler. While most often these polymers exhibit high conductivity, a major drawback lies in the relatively large amount of filler which is needed, often changing the base polymer properties.

The second category includes "doped" polymer systems. These systems will typically consist of unsaturated polymers which contain no conductive filler but are treated to contain amounts of selected oxidizing or reducing agents. Although highly conductive polymers can be prepared by this means, most of the polymers will suffer from a loss of conductivity on simple exposure to normal atmospheric conditions or mild heat. Many of these polymers are difficult to prepare and isolate, and cannot be processed by ordinary polymer techniques.

The third category of conductive polymers includes polymers which are conductive in the pristine state. In this category, conductivity is due to the molecular configuration of the thermally post-cured polymer. Conductive polymers within this category are known in the prior art. See, for example, U.S. Pat. No. 4,178,430 to Bilow, and U.S. Pat. Nos. 4,283,557 and 4,336,362 to Walton. The monomeric precursors of these conductive polymers are ordinarily solids at room temperature. On heating, the monomers pass through a measurable temperature range in which they are in a viscous liquid or thermoplastic state. Within this range, prior to the onset of curing and the development of conductivity, these materials can be readily processed, in bulk, from the melt. The "processing window" of a conductive monomer herein is the temperature range between the endothermic minimum (where melting is just completed) and the temperature where polymerization just begins and is measured using a Differential Scanning Calorimeter (DSC) technique. This processing window where the monomer is in a liquid or thermoplastic state is a characterizing property of individual monomers and varies greatly with the monomer structure. In general, monomers having an unsymmetrical structure are likely to have a desirable wide processing window as compared to processing windows exhibited by symmetrical monomers.

Largely because of the noted deficiencies of the filled and doped polymers, interest in new intrinsically conductive or semi-conductive polymers remains high.

SUMMARY OF THE INVENTION

The present invention provides a new class of mono- or difunctional phenylacetylene-substituted Schiff's base monomers which melt on heating, go through a thermoplastic, viscous liquid state, and thereafter on continued heating at high temperatures become thermoset, electrically conducting polymers. The invention further provides monomeric precursors of conducting polymers where most members of the class will slowly cure to set when held at temperatures above the melting point and cure more rapidly at temperatures greater than 200° C. or more. It further provides an opportunity to produce cured polymeric molded articles possessing a bulk electroconductivity ($\sigma$) of a least $10^{-2}$ S/cm.

The molecular formula of the novel monomers of the invention are:

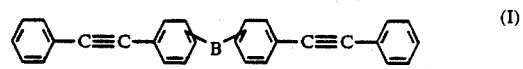

(I)

where B is

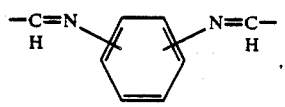

,

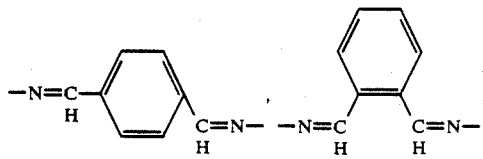

,

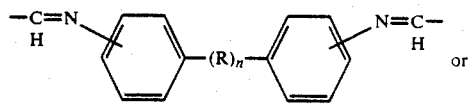

or

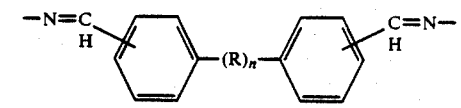

and R is $CH_2$, $C(CH_3)_2$, $CHOH$,

$C(CF_3)_2$, $SO_2$, S, $CH_2CH_2$, $HC=CH$, O,

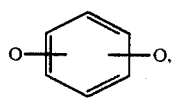

n=0 or 1; and

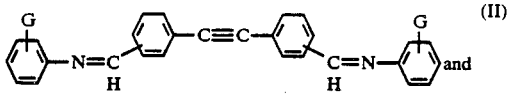 (II)

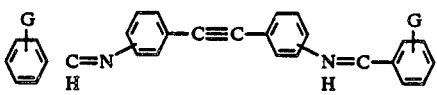

where G is C≡CH, H,

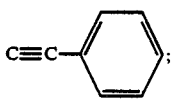;

and

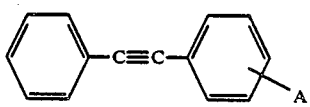 (III)

where A is

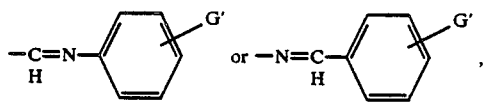, where G' is C≡CH, H, and

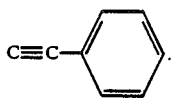.

The mono- or difunctional phenylacetylene-substituted Schiff's base monomers of Structure I above are prepared by first catalytically reacting phenylacetylene with a suitable bromobenzaldehyde to yield a corresponding phenylethynylbenzaldehyde intermediate. Another intermediate, phenylethynylaniline is prepared by catalytically reacting an aminophenylacetylene with bromobenzene. Other means for preparing these intermediates are known and may be used. For example, phenylethynylaniline may be prepared starting with a nitrobromobenzene which is reacted with phenylacetylene. The resulting nitro compound is later reduced to the amine. Either of the two intermediates is thereafter further reacted with compounds such as, for example, phenylene diamine, methylene dianiline, oxydianiline, aminophenyl sulfone, terephthalaldehyde, and isophthalaldehyde, where the aldehyde and amine groups are reacted to provide the acetylene-substituted Schiff's base monomers of the invention.

Monomers of structures (II) above require different intermediates, e.g. intermediates prepared from a palladium catalyzed coupling reaction of the appropriate bromobenzaldehyde with ethynylbenzaldehyde or the reaction of ethynylaniline with an appropriate bromoaniline. Subsequent reaction of the dialdehyde intermediate with aniline, ethynylaniline or phenylethynylaniline or reaction of the diamine intermediate with benzaldehyde, ethynylbenzaldehyde or phenylethynylbenzaldehyde yields the desired difunctional phenylacetylene substituted Schiff's base monomers.

Additionally, the reaction of these phenylethynylbenzaldehyde intermediates with aniline or ethynylanilines or the reaction of phenylethynylaniline with benzaldehyde or ethynylbenaldehyde will result in the formation of the monofunctional phenylacetylene substituted structures represented in (III) above. Reaction of the two intermediates, i.e., phenylethynylbenzaldehyde and phenylethynylaniline, with one another yields a corresponding phenylethynyl monomer containing the Schiff's base functionality.

DESCRIPTION OF PREFERRED EMBODIMENTS

With respect to the coupling reaction of the bromobenzaldehyde and the phenylacetylene as well as the reaction of bromobenzene and aminophenylacetylene, the reaction is run preferably in triethylamine which serves as a solvent and scavenger for the hydrogen bromide generated during the ethynylation reaction. Other useful amines which can be used in place of triethylamine are, for example, diethylamine, butylamines (mono, di and trisubstituted), pyridine, and the like. A co-solvent such as toluene, xylene, dimethylformamide, and dimethylacetamide can also be used to improve the solubility of the starting materials. The reaction requires the presence of a catalytic amount of a palladium catalytic species which, for example, may be palladium acetate, palladium chloride, etc. Optionally, to hasten the coupling reaction a co-catalyst may also be used. Suitable co-catalysts include cuprous salts, for example, cuprous chloride, cuprous bromide, and cuprous iodide which is preferred. Use of palladium catalysts to promote coupling reactions of aromatic halides with acetylene compounds is described in the literature, for example, Richard F. Heck, *Palladium Reagents in Organic Syntheses*, Academic Press, New York 1985, Chapter 6, Section 6.8.1. Additionally, to improve the utility of the palladium catalyst, a solubilizing phosphine ligand is often used. Examples of such phosphine ligands include triorthotoluylphosphine and triphenylphosphine which is preferred because of its availability and cost.

The reaction is run in an inert atmosphere at atmospheric pressure at a temperature of 75°–85° C. for about 6–18 hours. The reaction is monitored by gas-liquid chromatography tracking the disappearance of starting material and/or appearance of product.

The reaction conditions for providing Schiff's bases are well known and no special precautions are needed herein.

The monomeric compounds of the invention are solid, non-conductors. Heating melts the monomers to yield a thermoplastic, tacky, viscous liquid mass. Most of the monomers of the invention will start to melt at temperatures between 140°–160° C. It is in this state that the monomers are molded or conveniently processed to produce the desired end-products. To provide the thermoset electrically conducting polymer, thermal post-curing in the range of 300°–800° C. for about 10 to 100 hours is required. The monomers herein also may be solution polymerized and the polymer thereafter subjected to thermal post-curing to develop electroconductivity.

In addition to providing homopolymers by heating of the monomeric precursors, it is also within the scope of the invention to provide electrically conducting copolymers where mixtures of two or more monomers of the invention are well mixed in their viscous liquid state. Copolymers may also be prepared from mixtures using monomers of the invention and monomer(s) selected from the classes of maleimide and bis-maleimide monomers as well as other compatible monofunctional acetylenic monomers which produce heat stable polymers. The monomers of the invention may constitute a minor or major portion of the "mixed" copolymer.

The Schiff's base monomers herein as well as described mixtures can also find use in bonding articles by placing the monomer in contact between the articles to be bonded and exposing the composite to heat or heat and pressure, sufficient to polymerize the monomer. Likewise, one or more layers of woven fabric can be impregnated with a monomer (or monomer blend) of the invention to provide a high temperature stable composite thereof. The woven fabric can be made from, for example, glass, graphite or high temperature stable polyamide fibers.

The invention is further illustrated in connection with the following examples.

EXAMPLE I

Preparation of 4-Phenylethynylbenzaldehyde

A multinecked, round bottom flask fitted with a mechanical stirrer, reflux condenser and thermometer was flushed and maintained under a positive pressure of nitrogen. The flask was charged with 25 g (0.135 mol) of 4-bromobenzaldehyde, 250 ml of dried, degassed triethylamine, 15.2 g (0.148 mol) of phenylacetylene, 0.108 g (0.152 mmol) of bis(triphenylphosphine)palladium II chloride, 0.50 g (1.90 mmol) of triphenylphosphine and 0.5 g (0.262 mmol) of cuprous iodide. The mixture was brought to reflux temperature and maintained at that temperature overnight.

The following morning gas chromatography indicated no presence of 4-bromobenzaldehyde. The reaction mixture was cooled to room temperature. To separate the product from the triethylamine hydrobromide by-product, 500 ml of ether was added to the flask and the mixture was stirred for 1 hour. The triethylamine hydrobromide was separated by filtration and the filtrate was concentrated on a rotary evaporator yielding a crystalline solid in the mother liquor. The mixture was chilled overnight in the refrigerator and subsequent filtration yielded 23.3 g (0.113 mol, 84% yield) of product as off-white platelets.

Analysis: IR (KBr pellet), 2225 $cm^{-1}$ (C≡C, weak) 1710 $cm^{-1}$ (C=O).
$^1$HMR (CDCl$_3$), δ10.0 (s, 1H, C$\underline{H}$O), 6.8–8.3 (m, 9H, Ar-$\underline{H}$) ppm. DSC (10° C./min, N$_2$) onset 95.5° C., minimum 98.8° C. (endothermic transition, 146 J/g).

EXAMPLE 2

Preparation of 3-Phenylethynylbenzaldehyde

A multinecked flask as described in Example I was charged with 100 g (0.54 mol) of 3-bromobenzaldehyde, 400 ml of dried, degassed triethylamine, 55.2 g (0.54 mol) of phenylacetylene, 0.43 g (0.61 mol) of bis(triphenylphosphine)palladium II chloride, 1.99 g (7.58 mmol) of triphenylphosphine and 0.10 g (0.52 mmol) of cuprous iodide. The mixture was brought to mild reflux and maintained at that temperature overnight.

The following morning gas chromatography indicated only a trace presence of 3-bromobenzaldehyde. The reaction mixture was cooled to room temperature and 250 ml of ether was added. The mixture was allowed to stir for 1 hour and then filtered to remove the triethylamine hydrobromide by-product. The filtrate was concentrated on the rotary evaporator to a yellow solid to which 100 ml of petroleum ether was added. On filtration, 101.2 g (0.49 mol, 91% yield) of the product was obtained as a yellow crystalline solid.

Analysis: IR (KBr pellet), 2225 $cm^{-1}$ (C≡C, weak) 1700 $cm^{-1}$ (C=O).
$^1$HMR (CDCl$_3$) δ9.2 (s, 1H, CHO), 6.4–7.3 (m, 9H, Ar-H)ppm. DSC (10° C./min, N$_2$) onset 44.6° C., minimum 48.0° C. (endothermic transition 95 J/g.

EXAMPLE 3

Preparation of 3(3-Formylphenyl)ethynylbenzaldehyde

A multinecked flask as described in Example I was charged with 35 g (0.27 mol) of 3-ethynylbenzaldehyde, 300 ml of dried, degassed triethylamine, 49.7 g (0.27 mol) of 3-bromobenzaldehyde, 0.21 g (0.30 mmol) of bis(triphenylphosphine)palladium II chloride, 1.0 g (3.8 mmol) of triphenylphosphine, and 0.05 g (0.262 mmol) of cuprous iodide. The system is brought to mild reflux and maintained at that temperature overnight.

The following morning gas chromatography indicated only a trace of each reactant. The mixture was cooled to room temperature and filtered. The funnel cake, a physical mixture of triethylamine hydrobromide and product, was washed with water to dissolve the hydrobromide salt. The insoluble product was filtered and dried overnight on the funnel, 55.5 g of the product was obtained (0.23 mol, 85% yield).

Analysis: IR (KBr pellet), 1700 $cm^{-1}$ (C=O).
$^1$HMR (CDCl$_3$) δ9.8 (s, 2H, CHO), 7.0–8.2 (m, 8H, Ar-$\underline{H}$) ppm. DSC (10° C./min, N$_2$) onset 101° C., minimum 106.4° C. (endothermic transition 95 J/g).

EXAMPLE 4

Preparation of 3-Phenylethynylaniline

A multinecked flask as described in Example I was charged with 50 g (0.427 mol) of 3-aminophenylacetylene, 300 ml of dried, degassed triethylamine, 67 g (0.427 mol) of bromobenzene, 0.34 g (0.48 mmol) of bis(triphenylphosphine)palladium II chloride, and 0.05 g (0.262 mmol) of cuprous iodide. The system is brought to mild reflux and maintained at that temperature overnight.

The following morning gas chromatography indicated only a trace presence of 3-aminophenylacetylene. The system was cooled to room temperature and 200 ml of a 1:1 mixture of tetrahydrofuran and ether was added to the reaction mixture and allowed to stir for 1 hour. The triethylamine hydrobromide by-product was removed by filtration.

Concentration of the filtrate yielded the product as a dark oil which solidified on standing. Yield of product was 65%, based on amount of triethylamine hydrobromide isolated.

Analysis: IR (neat), 3460 and 3380 $cm^{-1}$ (NH$_2$), 2210 $cm^{-1}$ (C≡C).
$^1$ HMR (CDCl$_3$) δ6.2–8.0 (m, 9H, Ar-$\underline{H}$), 3.5 (s broad, 2H, N$\underline{H}_2$) ppm.

EXAMPLE 5

Preparation of Schiff's Base from 3-phenylethynylbenzaldehyde and 1,4-Phenylenediamine A multinecked round bottom flask fitted with a mechanical stirrer, reflux condenser, thermometer and a positive pressure of argon was charged with 19 g (0.092 mol) of 3 phenylethynlbenzaldehyde and 200 ml of ethanol. The mixture was heated to 40° C. and 4.6 g (0.042 mol) of 1, 4-phenylenediamine was added portion-wise. After the addition was completed, the mixture was allowed to cool to room temperature and was stirred overnight. The product, a dark yellow solid, was recovered by filtration: 20 g (0.033 mol, 97% yield). Recrystallization of the compound from heptane/benzene (3:1) yielded gold-colored crystals.

Analysis: IR (KBr pellet) 1620 cm$^{-1}$ (CH=N).
$^1$HMR (CDCl$_3$) δ8.5 (s, 2H, CH=N), 7.8–8.2 (m, 22H, Ar-H) ppm. DSC (10° C./min, N$_2$) onset 182.2° C., minimum 185.7° C. (endothermic transition, 125 J/g), onset 289.8° C., maximum 314.7° C. (exothermic transition, 446 J/g), Processing Window 89° C.

EXAMPLE 6

Preparation of Schiff's Base from 4-Phenylethynylbenzaldehyde and 1,4-Phenylenediamine This compound was prepared using a procedure similar to that described in Example 5. The reaction was carried out using 6.5 g (0.315 mol) of 4-phenylethynylbenzaldehyde, 100 ml of ethanol, and 1.6 g (0.015 mol) of 1, 4-phenylenediamine. The crystalline product was isolated in a 87% yield (6.5 g, 0.013 mol).

Analysis: IR (KBr pellet) 1620 cm$^{-1}$ (CH=N).
DSC (10° C./mm, N$_2$) onset 271.7° C., minimum 277.3° C. (endothermic transition 89 J/g), onset 312.8° C., maximum 326.3° C. (exothermic transition 446 J/g), Processing Window 7° C.

EXAMPLE 7

Preparation of Schiff's Base from 3-Phenylethynylbenzaldehyde and 1,3-Phenylenediamine Using a procedure similar to that described in Example 5, the reaction was carried out using 5.2 g (0.025 mol) of 3-phenylethynylbenzaldehyde, 50 ml of ethanol and 1.3 g (0.12 mol) of 1,3-phenylenediamine. The crystalline product was isolated in a 91% yield (5.3 g, 0.011 mol).

Analysis: IR (KBr pellet) 1620 cm$^{-1}$ (CH=N).
$^1$HMR (CDCl$_3$) δ8.45 (s, 2H, CH=N), 6.9–8.2 (m, 22H, Ar-H) ppm.
DSC (10° C./min, N$_2$) onset 112.6° C., minimum 125.6° C. (endothermic transition 72 J/g), onset 285.5° C., maximum 308.8° C. (exothermic transition 515 J/g), Processing Window 139° C.

EXAMPLE 8

Preparation of Schiff's Base from 3-Phenylethynylbenzaldehyde and 4, 4'-Methylenedianiline.

A multi-necked flask as described in Example 5 was charged with 6.5 g (0.0315 mol) of 3-phenylethynylbenzaldehyde and 125 ml of ethanol. To this mixture was added, portionwise, 3.0 g (0.150 mol) of 4,4'-methylenedianiline. The resultant mixture was then heated to 60° C. for 15 minutes, cooled to room temperature and allowed to stir overnight. The product, an off-white solid, 8.5 g (0.0147 mol, 98% yield) was isolated by filtration. The compound can be recrystallized by boiling in heptane and adding just enough toluene to effect solution.

Analysis: IR (KBr pellet) 1630 cm$^{-1}$ (CH=N).
$^1$HMR (CDCl$_3$) δ8.35 (s, 2H, CH=N), 6.6–8.0 (m, 26H, Ar-H), 3.9 (s, 2H, CH$_2$) ppm.
DSC (10° C./min, N$_2$), onset 172.8° C., minimum 176.7° C. (endothermic transition 99 J/g), onset 281.9° C., maximum 315.2° C. (exothermic transition 471 J/g), Processing Window 78° C.

EXAMPLE 9

Preparation of Schiff's Base from 3-Phenylethynylaniline and Terephthalaldehyde

A multinecked flask as described in Example 5 was charged with 3.0 g (0.022 mol) of terephthalaldehyde and 50 ml of ethanol. To this mixture is added 8.9 g (0.046 mol) of 3-phenylethynylaniline in 50 ml of ethanol. The resultant mixture is stirred overnight at room temperature. The product, a yellow solid, was isolated by filtration; 10.0 g (0.021 mol, 95% yield). The product is recrystallized from isobutyl alcohol.

Analysis: (KBr pellet) 1625 cm$^{-1}$ (CH=N).
$^1$HMR (CDCl$_3$) δ8.5 (s, 2H, CH=N), 7.1–8.1 (m, 22H, Ar-H) ppm.
DSC (10° C./min, N$_2$) onset 161.9° C., minimum 168.8° C. (endothermic transition 94 J/g), onset 272.8° C., maximum 298.1° C. (exothermic transition 456 J/g), Processing Window 81° C.

EXAMPLE 10

Preparation of Schiff's Base from 3-Phenylethynylaniline and Isophthalaldehyde

This compound was prepared using a procedure similar to that of Example 9. The reaction was carried out using 3 g (0.022 mol) of isophthalaldehyde, a total of 100 ml of ethanol, and 8.9 g (0.046 mol) of 3-phenylethynylaniline. The product, a yellow solid, was isolated by filtration; 9.8 g (0.02 mol, 91% yield).

Analysis: IR (KBr pellet) 1625 cm$^{-1}$ (CH=N).
$^1$HMR (CDCl$_3$) δ8.5 (s, 2H, CH=N), 6.8–8.2 (m, 22H, Ar-H) ppm.
DSC (10° C./min, N$_2$) onset 105.2° C., minimum 120.1° C. (endothermic transition 39 J/g), onset 269.5° C., maximum 302.6° C. (exothermic transition 330 J/g), Processing Window 124° C.

EXAMPLE 11

Preparation of Schiff's Base from 3-phenylethynylaniline and 3(3-Formylphenyl)ethynylbenzaldehyde A multinecked flask as described in Example 5 was charged with 10.1 g (0.525 mol) of 3-phenylethynylaniline and 50 ml of ethanol. The system was heated to 50° C. at which point 5.8 g (0.0248 mol) of 3(3-formylphenyl)ethynylbenzaldehyde in 50 ml of ethanol was added to the reaction mixture. The temperature of the mixture was maintained at 50° C. for 30 minutes. The mixture was then cooled to room temperature and stirred overnight. The product, a tan solid, was isolated by filtration: 13.0 g (0.022 mol, 89% yield).

Analysis: IR (KBr pellet) 1625 cm$^{-1}$ (CH=N).
$^1$HMR (CDCl$_3$) δ8.5 (s, 2H, CH=N), 6.8–8.2 (m, 26H, Ar-H) ppm.
DSC (10° C./min, N$_2$) onset 159.1° C., minimum 168.4° C. (endothermic transition 80 J/g), onset 266.3°

C., maximum 307.1° C. (exothermic transition 527 J/g), Processing Window 66° C.

EXAMPLE 12

Preparation of Schiff's Base from 3-Phenylethynylbenzaldehyde and 3-Phenylethynylaniline This compound was prepared using a procedure similar to that used in the preparation of the monomer of Example 9. The reaction was carried out using 4.7 g (0.022 mol) of 3-phenylethynylbenzaldehyde, 100 ml of ethanol and 4.4 g (0.023 mol) of 3-phenylethynylaniline. The product was isolated by filtration: 7.5 g (0.021 mol, 95% yield). The product was recrystallized from isopropyl alcohol/water (7:3).

Analysis: (KBr pellet) 1635 cm$^{-1}$ (CH=N).

$^1$HMR (CDCl$_3$) δ8.45 (s, 1H, CH=N), 7.0-8.2 (m, 18H, Ar-$\underline{H}$) ppm.

DSC (10° C./min, N$_2$) onset 111.8° C., minimum 123.6° C. (endothermic transition 78 J/g), onset 286° C., maximum 310.9° C. (exothermic transition 567 J/g), Processing Window 141° C.

EXAMPLE 13

Preparation of Schiff's Base from 3-Phenylethynylbenzaldehyde and Aniline

A multinecked flask as described in Example 5 was charged with 5.4 g of 3-phenylethynylbenzaldehyde, 50 ml of ethanol and 2.3 g (0.025 mol) of aniline. The solution was heated to 55° C. and held at that temperature for 5 minutes. The solution was cooled to room temperature, stirred overnight, and then concentrated on a rotary evaporator to a yellow oil which solidified on standing to give 6.9 g of product (0.024 mol, 96% yield), as a tan solid. The compound was recrystallized from petroleum ether.

Analysis: IR (KBr pellet) 1630 cm$^{-1}$ (CH=N).

$^1$HMR (CDCl$_3$) δ8.45 (s, 1H, $\underline{CH}$=N), 6.9-8.1 (m, 14H, Ar-H) ppm.

DSC (10° C./min. N$_2$) onset 55.1° C., minimum 59.1° C. (endothermic transition 79 J/g), onset 296.8° C., maximum 324.2° C. (ethothermic transition 577 J/g), Processing Window 223° C.

EXAMPLE 14

Preparation of Schiff's Base from 3-phenylethynylbenzaldehyde and 3-Aminophenylacetylene This compound was prepared using a procedure similar to that used in the preparation of the monomer of Example 13. The reaction was carried out using 5.0 g (0.024 mol) of 3-phenylethynylbenzaldehyde, 50 ml of ethanol, and 3.0 g (0.025 mol) of 3-aminophenylacetylene. The product was isolated as a red oil which solidified on standing: 6.8 g (0.022 mol, 92% yield).

Analysis: IR (KBr pellet) 3295 cm$^{-1}$ (C≡$\underline{CH}$), 1630 cm$^{-1}$ (CH=N).

$^1$HMR (CDCl$_3$) δ8.3 (s, 1H, $\underline{CH}$=N), 6.6-8.1 (m, 13H, Ar-H), 3.1 (s, 1H, C≡$\underline{CH}$) ppm.

DSC (10° C./min, N$_2$) onset 215.9° C., maximum 245.2° C. (exothermic transition 753 J/g), Processing Window 160° C.

EXAMPLE 15

Preparation of Schiff's Base from 3-Aminophenylacetylene and 3(3-Formylphenyl)ethynylbenzaldehyde.

Using a procedure similar to that described in Example 5, 10.8 g (0.044 mol) of 3(3-formylphenyl)ethynylbenzaldehyde was reacted with 11.2 g (0.096 mol) of 3-aminophenylacetylene in 150 ml of ethanol. The product precipitated as an off-white solid, 15.8 g (0.036 mol, 82% yield). This monomer was used without further purification.

Analysis: IR (KBr pellet), 3280 cm$^{-1}$ (C≡$\underline{CH}$), 1635 cm$^{-1}$ (CH=N).

$^1$HMR (CDCl$_3$) δ8.35 (s, 2H, CH=N), 6.9-8.1 (m, 16H, Ar-$\underline{H}$), and 3.10 (s, 2H, C≡$\underline{CH}$) ppm.

DSC (10° C./min. N$_2$) onset 100.7° C., minimum 110.6° C. (endothermic transition, 83.9 J/g), onset 206.5° C., maximum 229.9° C. hermic transition, 526 J/g), Processing Window 54° C.

EXAMPLE 16

Preparation of Schiff's Base from 4-Phenylethynylbenzaldehyde and 3-Phenylethynylaniline This monomer was prepared using a procedure similar to that described in Example 5. The reaction was carried out using 4.8 g (0.025 mol) of 3-phenylethynylaniline, 75 ml of ethanol and 5.2 g (0.025 mol) of 4-phenylethynylbenzaldehyde. The product which initially oils out solidified on standing to yield 8.1 g (0.022 mol; 89% yield). This monomer was purified by dissolving the crude product in hot isopropyl alcohol, filtering, and concentrating the filtrate.

Analysis: IR (KBr pellet), 1630 cm$^{-1}$ (CH=N)

$^1$HMR (CDCl$_3$) δ8.44 (s, 1H, $\underline{CH}$=N), 7.20-8.00 (m, 18H, Ar-$\underline{H}$) ppm.

DSC (10° C./min. N$_2$) onset 133.8° C., minimum 140.4° C. (endothermic transition, 74.5 J/g), onset 268.3° C., maximum 302.0° C. (exothermic transition, 519 J/g), Processing Window 95° C.

EXAMPLE 17

Preparation of Schiff's Base from 3-Phenylethynylbenzaldehyde and 4,4'-Oxydianiline Using a procedure similar to that described in Example 5, 3.2 g (0.016 mol) of 4,4'-oxydianiline was reacted with 6.6 g (0.032 mol) of 3-phenylethynylbenzaldehyde in 75 ml of ethanol. The product precipitated as an off-white solid and was filtered and dried (8.6 g, 0.015 mol, 94% yield). This monomer was purified by recrystallization from isopropyl alcohol/toluene.

Analysis: IR (KBr pellet), 1630 cm$^{-1}$ (CH=N), 1250 cm$^{-1}$ (Ar-O-Ar).

$^1$HMR (CDC$_3$) δ8.45 (s, 2H, CH=N), 6.90-8.20 (m, 26H, Ar-$\underline{H}$) ppm.

DSC (10° C./min. N$_2$) onset 143.4° C., minimum 146.5° C. (endothermic transition, 97.1 J/g), onset 298.1° C., maximum 327.6° C. (exothermic transition, 467 J/g), Processing Window 134° C.

EXAMPLE 18

Preparation of Schiff's Base from 3-Phenylethynylbenzaldehyde and 4-Aminophenylsulfide Using a procedure similar to that described in Example 5, 3.4 g (0.016 mol) of 4-aminophenylsulfide was reacted with 6.6 g (0.032 mol) of 3-phenylethynylbenzaldehyde in 75 ml of ethanol. The product precipitates as a yellow solid which was recrystallized from heptane/toluene (8.9 g, 0.015 mol, 94% yield).

Analysis: IR (KBr Pellet), 1630 cm$^{-1}$ (CH=N).

$^1$HMR (THF-d$_8$) δ8.60 (s, 2H, $\underline{CH}$=N), 7.10-8.30 (m, 26H, Ar-'uns/H/ ).

DSC (10° C./min. N₂) onset 170.3° C., minimum 175.6° C. (endothermic transition, 107 J/g), onset 291.2° C., maximum 313.7° C. (exothermic transition, 445 J/g), Processing Window 104°C.

EXAMPLE 19

Preparation of Schiff's Base from 3-Phenylethynylbenzaldehyde and 3-Aminophenylsulfone Using a procedure similar to that described in Example 5, 3.7 g (0.015 mol) of 3-aminophenylsulfone was reacted with 6.2 g (0.03 mol) of 3-phenylethynylbenzaldehyde in 75 ml of ethanol. The product, which initially oiled out of solution, was dissolved in hot ethanol which on cooling yielded off-white crystals, 8.0 g (0.013 mol, 85% yield).

Analysis: IR (KBr pellet), 1635 cm$^{-1}$ (CH=N), 1305 and 1150 cm$^{-1}$ (SO₂).

DSC (10° C./min. N2) onset 129.5° C., minimum 139.0C. (endothermic transition, 79 J/g), onset 272.2° C., maximum 305.8° C. (exothermic transition, 419 J/g), Processing Window 116° C.

EXAMPLE 20

Blend of Schiff's Base Monomer from Example 5 with the Schiff's Base Monomer from Example 8 (1:1)

To 0.6445 g of molten Schiff's base monomer from Example 5 was dissolved 0.6445 g of Schiff's base monomer from Example 8. Upon complete dissolution the material was allowed to cool to a hard glass-like solid. The sample remained completely homogeneous.

EXAMPLE 21

Blend of Schiff's Base Monomer from Example 9 with the Schiff's Base Monomer from Example 8 (3:1)

To 0.9668 g of molten Schiff's base monomer from Example 9 was dissolved 0.3223 g of Schiff's base monomer from Example 8. Upon complete dissolution the material was allowed to cool to a hard glass-like solid. The sample remained completely homogeneous.

EXAMPLE 22

Representative Schiff's base monomers of the invention were evaluated for thermal and oxidative stability employing a thermogravimetric analysis technique (TGA). All of the monomers undergo polymerization to a highly crosslinked polymer during the TGA procedure. Thermal-oxidative stability is an important property of these polymeric compounds particularly because high temperature post-cure for extended periods is needed to obtain conductivity in the thermoset polymers. Dynamic TGA's were run on the Schiff's base monomers at 10° C./min under compressed air using a DuPont 1090 Thermal Analyzer System with a DuPont 951 module. Thermal stability in the absence of oxygen was also determined in a similar manner.

Results showing the temperature at which decomposition begins and the percent residue of the sample after exposure to 800° C. in a nitrogen atmosphere are summarized in Table I below.

TABLE I

| Monomer Example No. | Decomposition Onset (°C.) | % Residue at 800° C. |
| --- | --- | --- |
| 5 | 527.5 | 73.8 |
| 6 | 521.8 | 79.9 |
| 7 | 509.6 | 75.2 |
| 8 | 522.8 | 72.9 |

TABLE I-continued

| Monomer Example No. | Decomposition Onset (°C.) | % Residue at 800° C. |
| --- | --- | --- |
| 9 | 522.6 | 76.3 |
| 10 | 515.9 | 76.7 |
| 11 | 522.1 | 65.5 |
| 12 | 299.4 | 65.2 |
| 13 | 270.1 | 27.1 |
| 14 | 510.5 | —* |
| 15 | 543.4 | —* |
| 16 | 345 (500) | 52.5 |
| 17 | 510 | 55.5 |
| 18 | 500 | 57.2 |
| 19 | 470 | —* |

*not determined

EXAMPLE 23

In this example the electroconductivity of typical post-cured Schiff's base monomers of the invention was evaluated.

Thermal polymerization of the disubstituted acetylene monomers was carried out in bulk from the melt by placing 1.0 to 1.5 g of monomer in a aluminum circular mold (1.0" diam.) and heating in an air circulating oven (Blue M) at 233° C. for 6 days. At this temperature, each monomer polymerized to a glossy surfaced, hard black solid within 5 hours. Weight loss data for representative samples after 6 days was recorded and is given in Table II below:

TABLE II

| Monomer of Example No. | Weight loss (%) |
| --- | --- |
| 5 | 3.67 |
| 7 | 3.00 |
| 8 | 1.07 |
| 9 | 2.87 |
| 10 | 0.92 |
| 11 | 1.01 |
| 12 | 8.93 |
| 13 | 65. |
| 15 | 0.13 (gain) |

The initially cured samples were then subjected to thermal post-cure under a nitrogen atmosphere in order to develop electroconductivity. Two post-cure methods were used (described below as Method A and Method B). Both methods yield substantially equivalent conductivity measurements.

Method A—In this method, portions of the solid pellet of polymer which results from the initial cure weighing between 50–90 mg are broken off and placed in the furnace of the thermogravmetric analyser for post-cure treatment. The sample is heated under nitrogen at a rate of 10° C./min from room temperature to a temperature of 800° C., and then rapidly cooled to room temperature.

Method B—In this method, the entire solid pellet of polymer which results from the initial cure is post-cured by heating under nitrogen in a programmable oven for 50 hours at 300° C., then heated at a rate of 0.5° C./min to a temperature of 600° C., and held at 600° C. for 50 hours. The oven temperature setting is then returned to room temperature.

Electrical conductivity evaluations were carried out on the post-cured samples at room temperature using an in-line four point probe. Bulk resistivity and bulk conductivity were calculated according to the following formula:

$$\rho = \frac{V}{A}(S)2\pi$$

where
S = probe spacings in cm
V = voltage drop in volts
A = applied current in amps
and $$\sigma = 1/\rho$$

Table 3 shows the bulk electrical conductivity for representative samples post-cured by Method A. Table 4 shows conductivity measurements for representative samples post-cured by Method B. Both tables also show the % weight loss of the samples during these post-cure conditions.

TABLE 3

| Monomer Example No. | (Method A) Conductivity (S/cm) | Wt. loss (%) |
|---|---|---|
| 5 | $1.23 \times 10^{-1}$ | 21.2 |
| 7 | $4.75 \times 10^{-2}$ | 22.0 |
| 8 | $5.91 \times 10^{-2}$ | 25.9 |
| 9 | $5.33 \times 10^{-2}$ | 20.9 |
| 10 | $6.37 \times 10^{-2}$ | 21.3 |
| 12 | $5.22 \times 10^{-2}$ | 19.4 |
| 16 | $8.03 \times 10^{-2}$ | 17.6 |
| 17 | $7.83 \times 10^{-2}$ | 25.5 |
| 18 | $7.46 \times 10^{-2}$ | 24.6 |
| 19 | $9.91 \times 10^{-2}$ | 21.4 |
| 20 | $1.40 \times 10^{-2}$ | 27.7 |
| 21 | $7.46 \times 10^{-2}$ | 24.6 |

TABLE 4

| Monomer Example No. | (Method B) Conductivity (S/cm) | Wt. loss (%) |
|---|---|---|
| 5 | $4.23 \times 10^{-2}$ | 12.2 |
| 7 | $3.13 \times 10^{-2}$ | 15.6 |
| 9 | $3.40 \times 10^{-2}$ | 14.8 |
| 10 | $4.35 \times 10^{-2}$ | 14.4 |
| 11 | $3.64 \times 10^{-2}$ | 12.1 |
| 15 | $4.75 \times 10^{-2}$ | 9.1 |

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:

1. A polymerizable phenylacetylene substituted Schiff's base monomer whose formula is:

  (I)

where B is

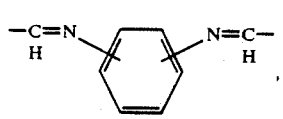

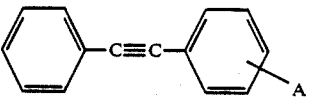

and R is CH$_2$, C(CH$_3$)$_2$, CHOH, $$\overset{O}{\underset{\|}{C}},$$

C(CF$_3$)$_2$, SO$_2$, S, CH$_2$CH$_2$, HC=CH, O,

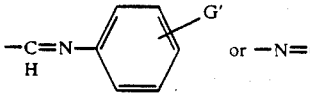

n = 0 or 1; and

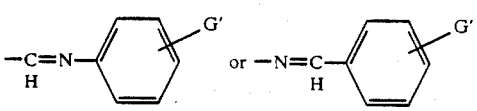

where G is C≡CH, H,

[benzene ring with C≡C— substituent];

and

[diphenylacetylene with A substituent]  (III)

where A is

[—C=N—phenyl—G'  or  —N=C—phenyl—G']

where G' is C≡CH, H, and

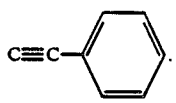

2. The Schiff's base monomer of claim 1, wherein part (I) B is

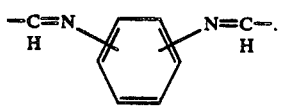

3. The Schiff's base monomer of claim 1, wherein part (I) B is

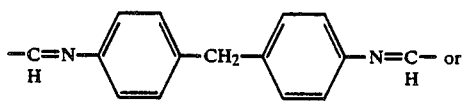

4. The Schiff's base monomer of claim 1, wherein part (I) B is

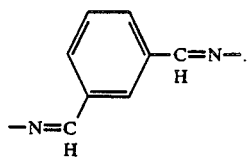

5. The Schiff's base monomer of claim 1, wherein part (I) B is

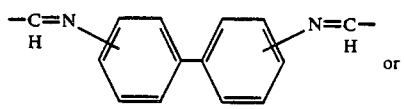

6. The Schiff's base monomer of claim 1, formula is:

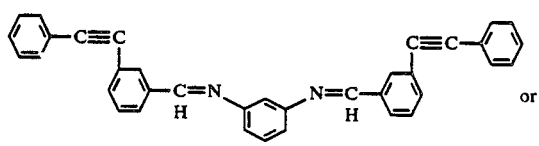

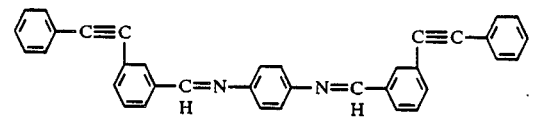

7. The Schiff's base monomer of claim 1, wherein part (II) G is C≡CH, or

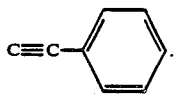

8. The Schiff's base monomer of claim 1, wherein part (III) A is

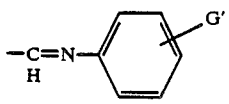

and G' is H or C≡CH.

9. A polymer obtained by heating from about the melting point, a Schiff's base monomer whose formula is:

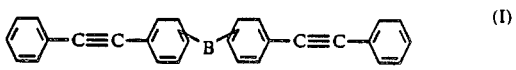 (I)

where B is

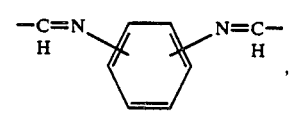

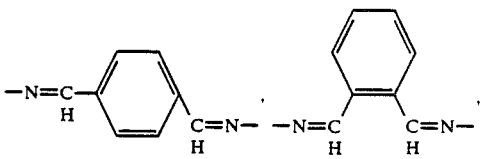

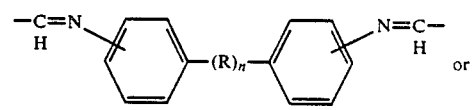 or

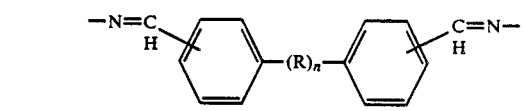

and R is $CH_2$, $C(CH_3)_2$, $CHOH$,

$C(CF_3)_2$, $SO_2$, S, $CH_2CH_2$, HC=CH, O,

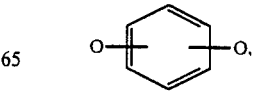

n=0 or 1; and

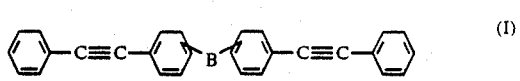 (I)

where B is

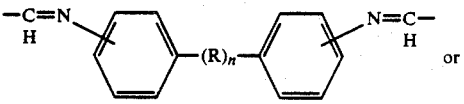,

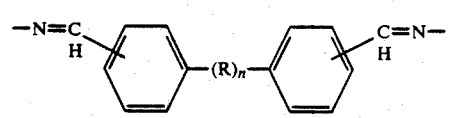,

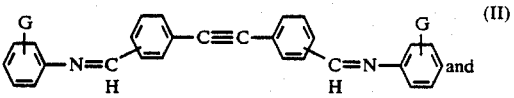 or

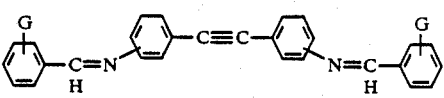

and R is CH₂, C(CH₃)₂, CHOH, $$\overset{O}{\underset{\|}{C}},$$

C(CF₃)₂, SO₂, S, CH₂ CH₂, HC=CH, O,

n=0 or 1; and

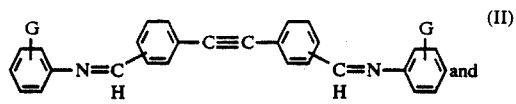 (II)

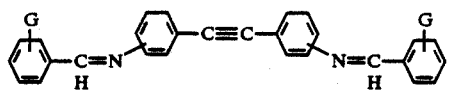

where G is C≡CH, H,

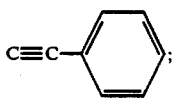;

and

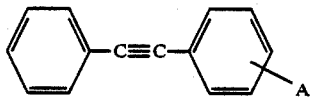 (III)

where A is

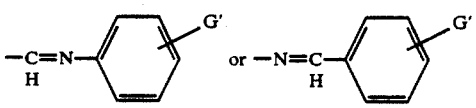, where G' is C≡CH, H, and

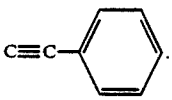.

10. A polymer obtained by heating from about the melting point, a Schiff's base monomer of claim 9, part (I).

11. A polymer obtained by heating from about the melting point, a Schiff's base monomer of claim 9, part (II).

12. A polymer obtained by heating from about the melting point, a Schiff's monomer of claim 9, part (III).

13. A copolymer of claim 9 obtained by heating a monomer mixture of two or more Schiff's base monomers.

14. A copolymer obtained by heating a monomer mixture of one or more Schiff's base monomers of claim 9 and a monomer selected from the classes of maleimide and bis-maleimide monomers.

15. A copolymer obtained by heating a monomer of claim 9 part I mixed with a monomer of claim 9 part II.

16. A method of bonding one article to another by placing a Schiff's base monomer between the articles to be bonded, applying heat or heat and pressure to said articles sufficient to polymerize the monomer and bond the articles, wherein the Schiff's base monomer comprises the polymerizable phenylacetylene substituted Schiff's base monomer whose formula is:

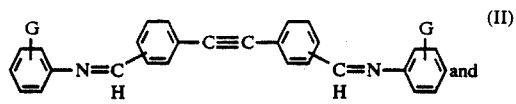 (II)

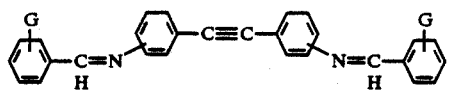

where G is C≡CH, H,

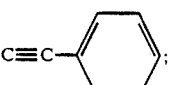;

and where A is
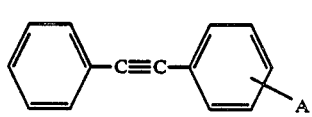
(III)
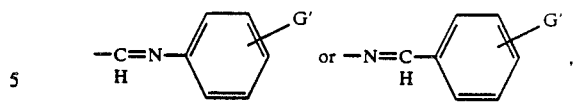
where G' is C≡CH, H, and
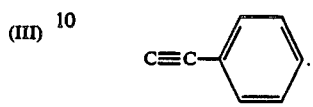
17. The method of claim 16, wherein the bonded article is a composite of the polymer impregnated in one or more layers of woven fabric.
18. The composite produced by the method of claim 17.
* * * * *